United States Patent
Sim et al.

(10) Patent No.: US 11,401,372 B2
(45) Date of Patent: *Aug. 2, 2022

(54) POLYESTER RESIN HAVING EXCELLENT HEAT RESISTANCE AND SOLUBILITY IN SOLVENTS, AND COATING COMPOSITION CONTAINING SAME

(71) Applicant: SK CHEMICALS CO., LTD., Seongnam-si (KR)

(72) Inventors: Jong-ki Sim, Gunpo-si (KR); Soon-Ki Kim, Suwon-si (KR)

(73) Assignee: SK CHEMICALS CO., LTD., Seongnam-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/063,387

(22) PCT Filed: Jan. 5, 2017

(86) PCT No.: PCT/KR2017/000135
§ 371 (c)(1),
(2) Date: Jun. 18, 2018

(87) PCT Pub. No.: WO2017/135582
PCT Pub. Date: Aug. 10, 2017

(65) Prior Publication Data
US 2019/0077908 A1   Mar. 14, 2019

(30) Foreign Application Priority Data
Feb. 4, 2016 (KR) .......................... 10-2016-0014425

(51) Int. Cl.
| C08G 63/668 | (2006.01) |
| C08G 63/66 | (2006.01) |
| C08G 63/02 | (2006.01) |
| C09D 167/02 | (2006.01) |
| C09D 7/00 | (2018.01) |
| C09D 7/40 | (2018.01) |
| C08G 63/672 | (2006.01) |
| C09D 7/20 | (2018.01) |

(52) U.S. Cl.
CPC .......... *C08G 63/668* (2013.01); *C08G 63/02* (2013.01); *C08G 63/66* (2013.01); *C08G 63/672* (2013.01); *C09D 7/00* (2013.01); *C09D 7/20* (2018.01); *C09D 7/40* (2018.01); *C09D 167/02* (2013.01); *C09D 167/025* (2013.01)

(58) Field of Classification Search
CPC .... C09D 167/02; C09D 167/025; C09D 7/00; C09D 7/20; C09D 7/40; C08G 63/02; C08G 63/66; C08G 63/668; C08G 63/672
See application file for complete search history.

(56) References Cited

U.S. PATENT DOCUMENTS

| 9,169,365 B2 | 10/2015 | Lee et al. |
| 9,388,309 B2 | 7/2016 | Kim et al. |
| 10,093,771 B2 | 10/2018 | Kondo et al. |
| 2012/0177854 A1 | 7/2012 | Lee et al. |
| 2018/0362707 A1 | 12/2018 | Jacquel et al. |

FOREIGN PATENT DOCUMENTS

| JP | 2003-119259 | * | 4/2003 |
| JP | 2010-95696 A | | 4/2010 |
| JP | 2011-190349 | * | 9/2011 |
| JP | 2011-190349 A | | 9/2011 |
| JP | 2012-224666 A | | 11/2012 |
| JP | 2013510919 A | | 3/2013 |
| JP | 2014507531 A | | 3/2014 |
| JP | 2014-205335 A | | 10/2014 |
| JP | 2015-221906 A | | 12/2015 |
| KR | 1020100024304 A | | 3/2010 |
| KR | 10-1058974 B1 | | 8/2011 |
| WO | 2014/069659 A1 | | 5/2014 |
| WO | 2015163400 A1 | | 10/2015 |
| WO | 2017093685 A1 | | 6/2017 |

OTHER PUBLICATIONS

"Tricyclodecanedimethanol", PubChem Tech.Publication, retrived on Feb. 24, 2020 https://pubchem.ncbi.nlm.nih.gov/compound/Tricyclodecanedimethanol (Year: 2020).*
Nicolas Descamps et al "Isothermal Crystallization Kinetics of Poly(ethylene terephthalate) Copolymerized with Various Amounts of Isosorbide", Applied Sciences, Appl. Sci. 2020, 10, 1046; doi: 10.3390/app10031046 (Year: 2020).*
International Search Report for PCT/KR2017/000135 dated Apr. 13, 2017 [PCT/ISA/210].
Intellectual Property Office of Taiwan, Communication dated May 25, 2018 in counterpart application No. 106100969.

* cited by examiner

*Primary Examiner* — Frances Tischler
*Assistant Examiner* — Gennadiy Mesh
(74) *Attorney, Agent, or Firm* — Sughrue Mion, PLLC

(57) ABSTRACT

A polyester resin and a coating composition containing the polyester resin are disclosed. The polyester resin includes a repeating unit obtained by copolymerizing (a) a divalent acid component and (b) a diol component containing (b-1) an isosorbide and (b-2) a cycloaliphatic diol, and has excellent heat resistance and solubility in a solvent. The cycloaliphatic diol may be one or more diol derivatives of a tricycle $C_{7-14}$ alkane. A coating formed from a coating composition containing the polyester shows excellent heat resistance, hardness, chemical resistance, pollution resistance, and hydrolysis resistance.

16 Claims, No Drawings

POLYESTER RESIN HAVING EXCELLENT HEAT RESISTANCE AND SOLUBILITY IN SOLVENTS, AND COATING COMPOSITION CONTAINING SAME

CROSS REFERENCE TO RELATED APPLICATIONS

This application is a National Stage of International Application No. PCT/KR2017/000135 filed Jan. 5, 2017, claiming priority based on Korean Patent Application No. 10-2016-0014425 filed Feb. 4, 2016.

TECHNICAL FIELD

The present invention relates to a polyester resin having excellent heat-resistance and solvent-solubility and a coating composition comprising same, which is capable of forming a coating film having excellent heat-resistance, hardness, chemical-resistance, fouling-resistance, and hydrolysis-resistance.

BACKGROUND ART

A coating composition containing a polyester resin has good processability in forming a coating film and is considered to be used instead of a binder such as an alkyd resin, a vinyl resin, and a silicon resin. A polyester resin having a straight chain type linear structure has good processability, but has low heat-resistance (low Tg range) and low hardness of a coating film, resulting in limited use thereof. In order to improve such defects, a polyester resin obtained by copolymerizing a monomer having a ring type molecular structure which has a hard molecular structure such as isosorbide has been studied.

Korean Patent No. 10-1058974 discloses a method of preparing a polyester using a homogeneous aqueous solution of isosorbide. This method of preparing a polyester uses a homogeneous aqueous solution of isosorbide, and the effect of easily handling isosorbide may be attained.

However, when using a polyester resin binder obtained by copolymerizing a monomer such as isosorbide, the polymer structure was hardened to deteriorate solvent-solubility, and thus, industrial application thereof was limited.

DISCLOSURE OF INVENTION

Technical Problem

Therefore, it is an object of the present invention to provide a polyester resin having high heat-resistance with a glass transition temperature of 80° C. or higher and good solubility in solvents widely used in the industry.

It is another object of the present invention to provide a coating composition comprising the polyester resin which has excellent heat-resistance and solvent-solubility and is capable of forming a coating film having good hardness.

Solution to Problem

In accordance with one aspect of the present invention, there is provided a polyester resin comprising a repeating unit obtained by copolymerizing:
(a) a divalent acid component; and
(b) a diol component comprising isosorbide and a cycloaliphatic diol, wherein the polyester resin has a glass transition temperature of 80° C. or higher.

In accordance with another aspect of the present invention, there is provided a coating composition comprising the above-described polyester resin and an organic solvent.

Advantageous Effects of Invention

According to the present invention, it is possible to prepare a polyester resin comprising isosorbide which has high heat-resistance with a glass transition temperature of 80° C. or higher and good solubility in solvents widely used in the industry. In addition, the present invention provides a coating composition comprising the polyester resin which shows improved solubility to overcome the low solvent-solubility limitation of a conventional polyester resin containing isosorbide. The coating composition may be usefully used as a coating material for cans, electronic products, exterior materials of a building, and films, and as an adhesion material.

BEST MODE FOR CARRYING OUT THE INVENTION

The polyester resin of the present invention comprises a repeating unit obtained by copolymerizing (a) a divalent acid component, and (b) a diol component comprising isosorbide and a cycloaliphatic diol, and the polyester resin has a glass transition temperature of 80° C. or higher.

The diol component includes isosorbide which has a hard molecular structure and shows high heat-resistance, and a cycloaliphatic diol for improving heat-resistance and solvent-solubility of a resin. For example, the diol component may include 1 to 50 mol % of the isosorbide and 1 to 80 mol % of the cycloaliphatic diol on the basis of the total number of moles of the diol component. Particularly, the diol component may include 10 to 50 mol % of the isosorbide and 10 to 50 mol % of the cycloaliphatic diol on the basis of the total number of moles of the diol component. More particularly, the diol component may include 20 to 45 mol % of the isosorbide and 20 to 30 mol % of the cycloaliphatic diol on the basis of the total number of moles of the diol component.

The cycloaliphatic diol may be a diol derivative of at least one tricyclo$C_{7-14}$alkane, for example, a diol derivative of a compound selected from the group consisting of tricyclooctane, tricyclononane, tricyclodecane, tricycloundecane, tricyclododecane, tricycloheptane, tricyclotridecane, and tricyclotetradecane, or a mixture thereof.

Particularly, the cycloaliphatic diol may be a diol derivative of a compound selected from the group consisting of tricyclo[3.2.1.0$^{2,6}$]octane, tricyclo[4.2.1.0$^{2,6}$]nonane, tricyclo[5.2.1.0$^{2,6}$]decane, tricyclo[6.2.1.0$^{2,6}$]undecane, tricyclo[7.2.1.0$^{2,6}$]dodecane, tricyclo[4.2.1.1$^{2,5}$]decane, tricyclo[4.3.1.1$^{2,5}$]decane, tricyclo[4.4.1.1$^{2,5}$]decane, tricyclo[2.2.1.0$^{2,6}$]heptane, tricyclo[2.2.2.0$^{2,6}$]octane, tricyclo[3.2.2.0$^{2,6}$]nonane, tricyclo[3.3.1.1$^{3,6}$]decane, tricyclo[3.2.1.1$^{3,7}$]nonane, tricyclo[4.2.2.2$^{2,5}$]dodecane, tricyclo[4.3.2.2$^{2,5}$]tridecane, tricyclo[4.4.2.2$^{2,5}$]tetradecane, tricyclo[4.2.1.0$^{3,7}$]nonane, tricyclo[4.4.1.1$^{1,5}$]dodecane, tricyclo[6.2.1.0$^{2,7}$]undecane, tricyclo[5.2.2.0$^{2,6}$]undecane, tricyclo[6.2.2.0$^{2,7}$]dodecane, tricyclo[4.3.2.0$^{2,5}$]undecane, tricyclo[4.2.2.0$^{2,5}$]decane, and tricyclo[5.5.1.0$^{3,11}$]tridecane, or a mixture thereof. More particularly, the cycloaliphatic diol may be a dimethanol derivative of a compound selected from the group consisting of tricyclo[7.2.1.0$^{2,6}$]dodecane, tricyclo[4.2.2.2$^{2,5}$]dodecane, tricyclo[4.4.1.1$^{1,5}$]dodecane, and tricyclo[6.2.2.0$^{2,7}$]dodecane, or a mixture thereof.

In addition, the diol component may additionally include at least one compound selected from the group consisting of ethylene glycol, diethylene glycol, triethylene glycol, propanediol, 1,4-butanediol, pentanediol, hexanediol, neopentyl glycol, 1,2-cyclohexanediol, 1,4-cyclohexanediol, 1,2-cyclohexanedimethanol, 1,3-cyclohexanedimethanol, 1,4-cyclohexanedimethanol, and tetramethyl cyclobutanediol, in a remaining amount excluding the isosorbide and the cycloaliphatic diol, for example, in an amount of 19 to 80 mol % on the basis of the total number of moles of the diol component. For example, the propanediol may be 1,2-propanediol or 1,3-propanediol. In addition, the hexanediol may be 1,6-hexanediol. Particularly, the diol component may additionally include neopentyl glycol, and the molar ratio of the sum of the isosorbide and the cycloaliphatic diol and the neopentyl glycol in the diol component may be 0.5 to 2.5:1. More particularly, the molar ratio of the sum of the isosorbide and the cycloaliphatic diol and the neopentyl glycol in the diol component may be 0.5 to 1.8:1, 0.5 to 1.5:1, or 0.5 to 1.3:1.

The divalent acid component may include at least one $C_8$-$C_{14}$ aromatic dicarboxylic acid, and may include a compound selected from the group consisting of terephthalic acid, isophthalic acid, naphthalene dicarboxylic acid, diphenyl dicarboxylic acid, a derivative thereof, and a mixture thereof. When an aliphatic dicarboxylic acid, instead of the aromatic dicarboxylic acid, is used as the divalent acid component, the glass transition temperature decreases, and thus, it is difficult to prepare a polyester resin with a high heat-resistance. For example, the naphthalene dicarboxylic acid may be 2,6-naphthalene dicarboxylic acid. Particularly, the divalent acid component may include a compound selected from the group consisting of terephthalic acid, isophthalic acid, and a mixture thereof in an amount of 1 to 100 mol %, 50 to 100 mol %, 70 to 100 mol %, 70 to 99 mol %, or 70 to 95 mol % on the basis of the total number of moles of the divalent acid component. When the amount of terephthalic acid and/or isophthalic acid among the divalent acid component is within the above range, too low glass transition temperature of the polyester resin thus prepared can be prevented (Tg of 80° C. or higher is possible), and deterioration of hardness after coating can be prevented.

The divalent acid component may include a residual amount of other aromatic or aliphatic dicarboxylic acid(s) excluding the terephthalic acid and the isophthalic acid. In this disclosure, the term "terephthalic acid" means terephthalic acid and a derivative component for forming an ester such as an alkyl ester thereof (a lower alkyl ester of $C_1$ to $C_4$ including monomethyl, monoethyl, dimethyl, diethyl or dibutyl ester), and an acid anhydride thereof. In addition, the terephthalic acid reacts with the diol component to form a terephthaloyl moiety.

In addition, in this disclosure, a divalent acid moiety and a diol moiety mean a residue remaining after hydrogen, a hydroxyl group or an alkoxy group is removed through a common polyester polymerization reaction of a divalent acid component and a diol component.

The molar ratio of the divalent acid component and the diol component may be 1:1.05 to 3.0. When the molar ratio of the divalent acid component and the diol component falls within the above range, unreacted divalent acid component does not remain after a polymerization reaction. Accordingly, the transparency of the resin obtained increases, and the polymerization reaction rate does not decrease, without productivity loss of the resin.

The polyester resin of the present invention may be prepared by additionally copolymerizing a trivalent acid and/or a tertiary alcohol component in addition to the divalent acid component and the diol component. The added amount thereof may be, for example, 0 to 10 mol %, and particularly, 0.1 to 10 mol % on the basis of the total number of moles of the total reaction components.

The polyester resin may have a number average molecular weight of 2,000 to 20,000, a hydroxyl value of 2 to 60 mgKOH/g, and an acid value of 0.1 to 20 mgKOH/g. Particularly, the polyester resin may have a number average molecular weight of 5,000 to 15,000, a hydroxyl value of 5 to 50 mgKOH/g, and an acid value of 1 to 5 mgKOH/g. When the number average molecular weight of the polyester resin falls within the above-described range, the deterioration of physical properties of a coating film may be prevented. In addition, when the hydroxyl value and the acid value of the polyester resin fall within the above-described ranges, sudden curing by thermal treatment may be prevented, and appearance defects and popping phenomenon may be avoided.

In addition, the polyester resin has a glass transition temperature of 80° C. or higher. Particularly, the polyester resin may have a glass transition temperature of 80 to 150° C., 80 to 130° C., or 80 to 120° C. When the glass transition temperature of the polyester resin falls within the above-described range, the chemical-resistance and hydrolysis-resistance of a coating film may be improved, and the hardness of a coating film does not deteriorate.

The polyester resin may have an intrinsic viscosity of 0.15 dl/g or more, and particularly, 0.3 dl/g or more when measured at 35° C. after being dissolved in o-chlorophenol (OCP) in a concentration of 1.2 g/dl.

The polyester resin may be prepared using the above-described components by a method known in the art. For example, the polyester resin (binder) of the present invention may be prepared by a preparation method including (i) a step of performing an esterification reaction or a transesterification reaction of (a) a divalent acid component and (b) a diol component including isosorbide and a cycloaliphatic diol; and (ii) a step of performing a polycondensation reaction of the esterification reaction product or transesterification reaction product. Particularly, a final vacuum degree of the polycondensation reaction is less than 2.0 mmHg, and the esterification reaction and the polycondensation reaction may be performed in an inert gas atmosphere. In addition, the polycondensation reaction may be performed for a necessary period until a target intrinsic viscosity is attained.

The step (i) may be performed under pressurization conditions of 0.1 to 3.0 kgf/cm$^2$, and at a temperature of 200 to 300° C. for an average retention time of 100 to 600 minutes. Particularly, the step (i) may be performed under pressurization conditions of 0.2 to 2.0 kgf/cm$^2$, and at a temperature of 240 to 270° C. for an average retention time of 120 to 500 minutes. The reaction conditions of step (i) may be changed according to the molar ratio of the divalent acid component and the diol component used.

In addition, an appropriate catalyst may be additionally used in the steps (i) and (ii) to decrease reaction time.

Further, prior to initiating the polycondensation reaction of the step (ii), a polycondensation catalyst, a stabilizer, a coloring agent, or the like may be added to the reaction product of the step (i). As the polycondensation catalyst, for example, one or more compounds among titanium, germanium, antimony, aluminum, and tin-based compounds may be appropriately selected and used. When a germanium compound is used as the polycondensation catalyst, superior color and reactivity of a polyester resin may be obtained. In addition, a phosphor-based compound such as phosphoric acid, trimethyl phosphate, and triethyl phosphate may be used as the stabilizer, and the added amount thereof may be 10 to 200 ppm with respect to the final polyester resin weight on the basis of the atomic weight of phosphor. When the added amount of the stabilizer falls within the above-described range, the stabilizing effect of the reaction product is good, the color change of the polyester resin to yellow may be prevented, and a desired polyester resin with high polymerization degree may be obtained. In addition, the coloring agent (for example, cobalt acetate) may be added to improve the color of the polyester resin.

The step (ii) may be performed under reduced pressure conditions of 0.1 to 2.0 mmHg at a temperature of 240 to 300° C. for an average retention time required to reach a desired intrinsic viscosity (for example, 1 to 10 hours). Particularly, the step (ii) may be performed under reduced pressure conditions of 0.1 to 2.0 mmHg at a temperature of 250 to 290° C., or 260 to 270° C. for an average retention time of 1 to 10 hours. The reduced pressure conditions are required to remove a diol component which is the by-product of the polycondensation reaction.

The present invention provides a solvent-based coating composition comprising the polyester resin mentioned and an organic solvent.

The coating composition includes an organic solvent in consideration of handling, coating workability, etc., and any solvent can be used as the organic solvent without any restriction as long as it may disperse the polyester resin and other components and can be easily removed. Particularly, the solvent may be selected from the group consisting of an aromatic hydrocarbon solvent, a glycol ester solvent, a glycol ether solvent, a ketone solvent, an alcohol solvent, and a mixture thereof.

The aromatic hydrocarbon solvent may include, for example, toluene, xylene, Kocosol (product name: #100 or #150) manufactured by SK Energy Co. Ltd., or the like. The glycol ester solvent may include, for example, ethyl acetate, butyl acetate, cellosolve acetate, propylene glycol monomethyl acetate, ethylene glycol diacetate, ethylene glycol diethyl ether, ethylene glycol dimethyl ether, ethylene glycol monobutyl ether, ethylene glycol monoethyl ether, 3-methoxybutyl acetate, or the like. The glycol ether solvent may include, for example, methyl cellosolve, ethyl cellosolve, ethylene glycol butyl ether, diethylene glycol methyl ether, diethylene glycol ethyl ether, diethylene glycol butyl ether, or the like. The ketone solvent may include, for example, acetone, acetonitrile, methyl ethyl ketone, methyl isobutyl ketone, cyclohexanone, or the like. The alcohol solvent may include, for example, ethanol, isopropanol, n-butanol, amyl alcohol, cyclohexanol, or the like.

In addition, the organic solvent may include chloroform, cresol, hexane, tetrahydrofuran, isophorone, dibasic ester, or the like.

The solvent may be included in an amount of 60 to 90 wt %, and particularly, 60 to 80 wt % on the basis of the total amount of the coating composition. Within the amount range of the solvent, the adhesiveness of a coating film thus formed is good, and the drying time in the process of forming a coating film may shorten.

The coating composition may include 10 to 40 wt %, and particularly, 20 to 40 wt % of the polyester resin on the basis of the total amount of the coating composition.

In addition, the coating composition may additionally include a component selected from the group consisting of a cross-linking agent, a curing catalyst, an additive for slip property, a smoothening agent, a defoaming agent, a pigment, a leveling agent, and a mixture thereof.

The cross-linking agent may be added together with the polyester resin to form a coating film, and a conventional cross-linking agent may be used without limitation. For example, a melamine-based, an isocyanate-based, a carbodimide-based, an epoxy-based or a phenol-based cross-linking agent may be used.

The melamine-based cross-linking agent may be a melamine resin containing an amino group or a butoxy group, and a melamine resin containing a methoxy group (hereinafter referred to as "methoxy melamine resin"). The melamine resin containing an amino group or a butoxy group is favorable in increasing the hardness of a coating film, but when an acid catalyst is used, the reaction rate during baking at a high temperature (curing by heat treatment) and processability may be diminished as compared with the methoxy melamine resin. On the contrary, when the methoxy melamine resin is used together with an acid catalyst, the curing reaction rate is rapid, and the processability of a coating film is good. However, the hardness of the coating film may be relatively poor. Accordingly, in order to maintain the balance between the hardness of the coating film and the processability, a mixture of the melamine resin containing an amino group or a butoxy group and the methoxy melamine resin may be used in an amount ratio of 0.3 to 0.5:1 in the present invention. When the weight ratio of mixing falls within the above-described range, the deterioration of the processability and the surface hardness of the coating film may be prevented, and viscosity during storing a composition does not increase excessively.

In addition, the methoxy melamine resin may include, for example, CYMEL303 and CYMEL301 manufactured by CYTEC, BE 3747 and BE 3745 manufactured by BIP, RESIMENE 745 manufactured by MONSANTO, etc. The melamine resin containing an amino group or a butoxy group may include CYMEL 325 and CYMEL327 manufactured by CYTEC, BE 3748 and BE 3040 manufactured by BIP, RESIMENE 717 manufactured by MONSANTO, etc.

The added amount of the cross-linking agent may be 3 to 13 wt % on the basis of the total amount of the coating composition. When the added amount of the cross-linking agent falls within the above-described range, the deterioration of physical properties of a coating film such as solvent-resistance and hardness may be prevented. Particularly, the coating composition may include the methoxy melamine resin (methyl etherification melamine resin) in an amount of 2 to 8 wt %, and the melamine resin containing an amino group or a butoxy group in an amount of 1 to 5 wt %.

The curing catalyst may be added to promote the curing of a coating film, and any conventional curing catalyst may be used without limitation. For example, a sulfonic acid-based, an amine-based, or a tin-based curing catalyst may be used, and particularly, sulfonic acids such as p-toluene sulfonic acid (p-TSA), dinonylnaphthalene sulfonic acid (DNNSA), dinonylnaphthalene disulfonic acid (DNNDSA), and fluorosulfonic acid may be neutralized using amine or epoxy and then used. When a curing catalyst neutralized by amine or epoxy is used, the increase of viscosity and the deterioration of physical properties of a coating film during storing a coating composition may be prevented. Examples of commercially available curing catalyst may include NACURE2500, NACURE2510 and NACURE 2530 as the p-toluene sulfonic acid, NACURE1323, NACURE1419, NACURE1557 and NACURE1953 as the DNNSA, NACURE3525 and NACURE3527 as the DNNDSA, manufactured by KING, and FC520 manufactured by 3M as the fluorosulfonic acid. The curing catalyst may further include p-toluene sulfonic acid neutralized with a tertiary amine, dinonylnaphthalene sulfonic acid (DNNSA), or the like as an auxiliary curing catalyst.

The amine or epoxy is added to block the reaction of the curing catalyst, and the amine may include, for example, primary, secondary, and tertiary amine. In general, a primary amine may induce color change of a coating film to yellow, and a tertiary amine may generate contraction of the surface of a coating film with an excessive amount used. Accordingly, a secondary amine is preferable. The secondary amine may include, for example, diethylamine, diisopropylamine, diisopropanolamine, di-n-propylamine, di-n-butylamine, diisobutylamine, di-secondary-butylamine, diallylamine, diamylamine, N-ethyl-1,2-dimethylpropylamine, N-methylhexylamine, di-n-octylamine, piperidine, 2-pipecoline, 3-pipecoline, 4-pipecoline, morpholine, or the like. In addition, an effective amount thereof is mixed with the curing catalyst and added to the coating composition, thereby increasing the fouling-resistance of a coating film.

The curing catalyst may be added in an amount of 0.1 to 2.5 wt % on the basis of the total amount of the coating composition. Particularly, the curing catalyst may be added in an amount of 0.5 to 2.3 wt % on the basis of the total amount of the coating composition. When the added amount of the curing catalyst falls within the above-described range, a coating film with a sufficient hardness may be manufactured.

The additive for slip property may be added to prevent the generation of scratch by a worker during molding or scratch due to a nail of a user, etc. and any additive for slip property may be used without limitation. For example, a polyethylene (PE)-based wax, a polytetrafluoroethylene (PTFE)-based wax, a PTFE/PE mixture wax, etc., may be used. Meanwhile, when silicon oils are added as the additive for slip property, the surface tension of the silicon oils may be too low, and continuous roll coating workability may become poor.

A PTFE/PE mixture wax is preferable because a PE wax has good surface orientation but inferior slip property, and a PTFE wax has good slip property but poor surface orientation. When using the PTFE/PE mixture wax, the combination of better physical property of each may be possible. The PTFE/PE mixture wax is prepared using a high speed dispersing device so as to obtain a product in which the PTFE wax is attached around the PE wax which has a low density (i.e., the PTFE wax is attached by an electrostatic force around the PE wax which has a large particle size). A coating film using the PTFE/PE mixture wax may have good hardness and sufficient slip property. An average particle diameter of the PTFE/PE mixture wax may be 3 μm or less, and if the average particle diameter is greater than 3 μm, the appearance of the coating film may become poor.

The amount of the additive for slip property may be 0.3 to 10 wt % on the basis of the total amount of the coating composition. Within the above-described range, the deterioration of the gloss of the coating film may be prevented, and the coating film may have sufficient slip property.

Commercially available additives for slip property may include MPI-31, and F-600XF manufactured by Micro Powder, Ceraflour 995 and 996 manufactured by BYK, and SL-524 and SL-409 manufactured by Daniel Product.

In addition, in order to improve the workability of the coating composition, an additive such as clay, amide wax, and fumed silica may be additionally added, and the added amount thereof may be 0.1 to 1 wt % on the basis of the total amount of the coating composition.

The smoothening agent plays the role of controlling the surface defects of a coated layer such as crater phenomenon, pin hole, and coating stain. Commercially available smoothening agents may include, for example, BYK-350, BYK-354, BYK-355, or the like.

The smoothening agent may be included in an amount of 0.1 to 1.0 wt % on the basis of the total amount of the coating composition.

A leveling agent and/or a defoaming agent may be added to maintain the smoothness of a coating film of a coating composition and to improve defoaming property during performing a coating process. The leveling agent may be a common acryl-based, vinyl-based, or silicon-based leveling agent. Commercially available leveling agents may include disparion L-1980, disparion L-1984, and disparion AP-30 manufactured by Kusumoto Chemicals, and commercially available defoaming agents may include BYK356 and BYK410 manufactured by BYK.

The leveling agent may be added in an amount of 0.5 to 1.0 wt % on the basis of the total amount of the coating composition. In addition, the defoaming agent may be added in an amount of 0.5 to 1.0 wt % on the basis of the total amount of the coating composition.

In addition, the coating composition of the present invention may be a clear coating composition which does not contain any pigment, or a color coating composition which contains a pigment. The pigment may be any pigment which may be used in the field of a coating composition without limitation. For example, an organic pigment such as cyanine blue and cyanine green; an inorganic pigment such as titanium oxide, iron oxide, carbon black, chromium yellow, and diverse baked pigments; and a sieving pigment such as talc, clay, silica, mica, and alumina may be used.

The pigment may be added in an amount of 0 to 40 wt % on the basis of the total amount of the coating composition.

The coating composition may additionally include a metal or non-metal filler.

In the present invention, a polyester resin comprising isosorbide and a cycloaliphatic diol and having high heat-resistance with a glass transition temperature of 80° C. or higher, and good solubility in solvents widely used in industry may be prepared. In addition, the present invention provides a coating composition having improved solubility to overcome the low solvent-solubility limitation of a conventional polyester resin including isosorbide. The coating composition may be usefully used as a coating material for cans, electronic products, exterior materials of a building, and films, and as an adhesive material.

Mode for the Invention

Hereinafter, the present invention is explained in detail by examples and comparative examples. The following examples are intended to further illustrate the present invention without limiting its scope.

EXAMPLES

In the following examples and comparative examples, TPA means terephthalic acid, IPA means isophthalic acid, ISB means isosorbide (1,4:3,6-dianhydroglucitol), EG means ethylene glycol, NPG means neopentyl glycol, and TCDDM means tricycle[5.2.1.0$^{2,6}$]decane-4,8-dimethanol.

Example 1

Preparation of Polyester Resin 157 g of TPA and 157 g of IPA as divalent acid components, and 59 g of NPG, 9 g of EG, 82 g of TCDDM, and 194 g of ISB as diol components were added to a 1 L, three-necked flask, and 0.10 g of zinc acetate was added thereto, followed by performing an esterification reaction under pressurization conditions of 1 kgf/cm$^2$ at 260° C. for 240 minutes. When 110 g of water was drained out from a system during the esterification reaction, 0.2 g of a germanium dioxide catalyst and 0.05 g of a triethyl phosphonoacetate stabilizer were added under the atmospheric pressure, and a polycondensation reaction was performed. The polycondensation reaction was performed under reduced pressure conditions of 1.0 mmHg at 270° C., and the polymerization reaction was terminated when viscosity reached a constant value (intrinsic viscosity of 0.36 dl/g) to obtain a target polyester resin.

Examples 2 to 5 and Comparative Examples 1 to 3

Polyester resins were prepared by performing the same procedure described in Example 1 except for using the component and amount listed in the following Table 1.

TABLE 1

| | Material name | | | | | |
|---|---|---|---|---|---|---|
| | Divalent acid component (g) | | Diol component (g) | | | |
| | TPA | IPA | NPG | EG | TCDDM | ISB |
| Example 1 | 157 | 157 | 59 | 9 | 82 | 194 |
| Example 2 | 157 | 157 | 61 | 12 | 91 | 175 |
| Example 3 | 159 | 159 | 116 | 14 | 93 | 98 |
| Example 4 | 166 | 166 | 141 | 14 | 48 | 112 |
| Example 5 | 141 | 141 | — | 17 | 265 | 87 |
| Comparative Example 1 | 174 | 174 | 68 | 32 | — | 226 |
| Comparative Example 2 | 172 | 172 | 118 | 27 | — | 165 |
| Comparative Example 3 | 170 | 170 | 150 | 33 | 52 | 78 |

Experimental Example 1

Evaluation of Performance of Polyester Resin

Performance evaluation methods of the polyester resins prepared in the above examples and comparative examples are as follows.

(1) Components (Component Ratio of (TCDDM+ISB)/NPG)

A nuclear magnetic resonance (NMR, 600 MHz) analysis was utilized. A polyester resin was dissolved in chloroform-D, and proton NMR was measured to confirm the component ratio (molar ratio) of (TCDDM+ISB) mol %/NPG mol %.

(2) Intrinsic Viscosity (IV)

A polyester resin was dissolved in a concentration of 1.2 g/dl in o-chlorophenol at 150° C., and intrinsic viscosity (dl/g) was measured using an ubbelohde viscometer in a thermostat bath of 35° C.

(3) Heat-Resistance: Glass Transition Temperature (Tg)

As a glass-rubber transition temperature (Tg), a Tg temperature (° C.) with a temperature increasing rate of 10° C./min during secondary scanning, was measured.

(4) Number Average Molecular Weight (Mn)

The number average molecular weight was measured after dissolving a polyester resin in tetrahydrofuran by a gel permeation chromatography using a polystyrene standard.

(5) Solvent-Solubility

Solvent-solubility was obtained by dissolving a polyester resin in a concentration of 40 wt % in a solvent component listed in the following Table 2 by selecting typical four solvents of Kocosol-100 (K-100), cyclohexanone, toluene, and methyl ethyl ketone (MEK) among solvents widely used in the industry according to the boiling point, and observing whether the resin was completely dissolved or not. When the resin was completely dissolved into a clear state, it was indicated by O, and when insoluble resin remained or an unclear state/layer separation was observed over time, it was indicated by X.

The measured results of the physical properties are shown in the following Table 2.

TABLE 2

| | IV (dl/g) | Tg (° C.) | Mn | (TCDDM + ISB)/NPG component ratio (molar ratio) | Solvent-solubility | | |
|---|---|---|---|---|---|---|---|
| | | | | | cyclohexanone:K-100 = 50:50 by volume ratio | toluene:MEK = 50:50 by volume ratio | MEK |
| Example 1 | 0.36 | 120 | 12,000 | 2.2 | O | O | X |
| Example 2 | 0.39 | 112 | 14,000 | 1.9 | O | O | X |
| Example 3 | 0.44 | 93 | 16,000 | 0.8 | O | O | O |
| Example 4 | 0.41 | 87 | 15,000 | 0.5 | O | O | O |
| Example 5 | 0.37 | 111 | 13,000 | — | O | O | X |
| Comparative Example 1 | 0.38 | 112 | 13,000 | 1.7 | O | X | X |
| Comparative Example 2 | 0.48 | 98 | 17,000 | 0.7 | O | O | X |
| Comparative Example 3 | 0.52 | 79 | 20,000 | 0.3 | O | O | O |

As shown in Table 2, when compared with Comparative Examples 1 and 2 not using TCDDM which is a cycloaliphatic diol, all polyester resins of Examples 1 to 5 had a high glass transition temperature of 80° C. or higher, and solubility thereof in various solvents was good.

Further, when compared with Comparative Example 1 having a similar glass transition temperature, the polyester resins of Examples 2 and 5 were dissolved in a mixture solvent of toluene and MEK, showing improved solvent-solubility.

In addition, in Comparative Example 3 in which the (TCDDN+ISB)/NPG component ratio (molar ratio) was less than 0.5, the glass transition temperature was less than 80° C. and heat-resistance was low. Further, when the (TCDDN+ISB)/NPG component ratio (molar ratio) was 2.5 or more, the reaction time rapidly increased, and defects such as difficulty in the synthesis of a polymer, cost increase, and solubility decrease were shown (results not shown).

Examples 6 to 10 and Comparative Examples 4 to 6

Preparation of Coating Composition

In a mixture solvent of cyclohexanone/solvent naphtha 100 (manufacturer of solvent naphtha 100: SK Energy, product name: Kocosol-100) (50/50 by weight ratio), each of the polyester resins of Examples 1 to 5 and Comparative Examples 1 to 3 was dissolved in a concentration of 40 wt % to prepare resin solutions. 208 g of the resin solution, 100 g of $TiO_2$ (rutile type), and 1.5 g of a wetting agent (manufacturer: BYK, product name: BYK-110) were mixed to prepare a dispersion mixture (mill base).

0.6 g of the resin solution, 30 g of the dispersion mixture, 1.4 g of a cross-linking agent (manufacturer: CYTEC, product name: CYMEL-303), 0.8 g of a curing catalyst (manufacturer: King Industries, product name: Nacure1953), 3 g of the mixture solvent, and 0.2 g of a smoothening agent (manufacturer: BYK, product name: BYK-355) were mixed to prepare a coating composition.

Experimental Example 2

Evaluation of Physical Properties of Coating Composition

The evaluation methods of the performance of the coating compositions prepared in Examples 6 to 10 and Comparative Examples 4 to 6 are as follows.

(6) Gloss

A zinc plated steel plate with a thickness of 0.5 mm was coated with a coating composition and dried using a hot air drier at 230° C. for 5 minutes to manufacture a coated steel plate with the thickness of a coating film of 20 μm. The 60° surface gloss of the coated steel plate was measured using a gloss meter manufactured by BYK.

(7) MEK Rubbing

The same coated steel plate used in (6) above was rubbed using a gauze sufficiently soaked with MEK to measure chemical-resistance, and the number of rubbing was measured.

(8) Pendulum Hardness

With respect to the same coated steel plate used in (6) above, pendulum hardness was measured using a pendulum hardness tester of T.Q.C by a Konig measurement method and ISO 1522 (2005). Particularly, a pendulum (weight: 200 g) was put on the surface of a coated steel plate, and a state where the pendulum was stopped was set to 0°. Then, the pendulum was pulled to an angle of 6°, pendulum movement was started, and a time period until the angle became 3° was measured three times.

(9) Pencil Hardness

With respect to the same coated steel plate used in (6) above, scratch hardness of the coated film was measured using a Mitsubishi pencil. Pencils with diverse hardness were leaned against a test sample with an angle of 45 degrees. Then, the surface was scratched with a load of 750 g, and the hardness of the coated film was measured according to the damaged degree of the surface. Under the above-described conditions, the surface was scratched using a pencil with a specific hardness, and the maximum hardness value which did not generate scratches on the surface was recorded.

The measured results of physical properties are listed in the following Table 3.

TABLE 3

| | Gloss (60°) | MEK rubbing (number) | Pendulum hardness (seconds, average of three times) | Pencil hardness |
|---|---|---|---|---|
| Example 6 | 90 | >100 | 188 | H |
| Example 7 | 87 | >100 | 187 | H |
| Example 8 | 91 | >100 | 190 | H |
| Example 9 | 91 | >100 | 193 | H |
| Example 10 | 96 | >100 | 190 | H |
| Comparative Example 4 | 61 | >100 | 179 | H |
| Comparative Example 5 | 90 | >100 | 200 | H |
| Comparative Example 6 | 92 | >100 | 195 | F- |

As shown in Table 3, the coating composition of the present invention results in a coating film with good hardness, gloss, and scratch-resistance.

The invention claimed is:

1. A polyester resin comprising a repeating unit obtained by copolymerizing the following (a) and (b):
   (a) a divalent acid component;
   (b) a diol component comprising (b-1) an isosorbide, (b-2) a cycloaliphatic diol, and (b-3) neopentyl glycol,
   wherein the cycloaliphatic diol (b-2) is one or more diol derivatives of a tricycle C7-14 alkane;
   wherein a molar ratio of a sum of the isosorbide (b-1) and the cycloaliphatic diol (b-2) to the neopentyl glycol (b-3) is 0.5 to 2.5:1;
   wherein the diol component (b) comprises 1 to 50 mol % of the isosorbide (b-1) and 1 to 80 mol % of the cycloaliphatic diol (b-2) based on a total number of moles of the diol component;
   wherein an amount of the neopentyl glycol (b-3) employed for the copolymerization is 23 mol % to 52.3 mol % based on a total number of moles of the diol component (b) employed in the copolymerization; and
   wherein the polyester resin has a glass transition temperature of 80° C. or higher.

2. The polyester resin of claim 1, wherein the cycloaliphatic diol (b-2) is a diol derivative of a compound selected from the group consisting of tricyclo[3.2.1.0$^{2,6}$]octane, tricyclo[4.2.1.0$^{2,6}$]nonane, tricyclo[5.2.1.0$^{2,6}$]decane, tricyclo[6.2.1.0$^{2,6}$]undecane, tricyclo[7.2.1.0$^{2,6}$]dodecane, tricyclo[4.2.1.1$^{2,5}$]decane, tricyclo[4.3.1.1$^{2,5}$]decane, tricyclo[4.4.1.1$^{2,5}$]decane, tricyclo[2.2.1.0$^{2,6}$]heptane, tricyclo[2.2.2.0$^{2,6}$]octane, tricyclo[3.2.2.0$^{2,6}$]nonane, tricyclo[3.3.1.1$^{3,6}$]decane, tricyclo[3.2.1.1$^{3,7}$]nonane, tricyclo[4.2.2.2$^{2,5}$]dodecane, tricyclo[4.3.2.2$^{2,5}$]tridecane, tricyclo[4.4.2.2$^{2,5}$]tetradecane, tricyclo[4.2.1.0$^{3,7}$]nonane, tricyclo[4.4.1.1$^{1,5}$]dodecane, tricyclo[6.2.1.0$^{2,7}$]undecane, tricyclo[5.2.2.0$^{2,6}$]undecane, tricyclo[6.2.2.0$^{2,7}$]dodecane, tricyclo[4.3.2.0$^{2,5}$]undecane, tricyclo[4.2.2.0$^{2,5}$]decane and tricyclo[5.5.1.0$^{3,11}$]tridecane, or a mixture thereof.

3. The polyester resin of claim 1, wherein the divalent acid component (a) comprises one or more $C_8$-$C_{14}$ aromatic dicarboxylic acids.

4. The polyester resin of claim 1, wherein the divalent acid component (a) comprises a compound selected from the group consisting of terephthalic acid, isophthalic acid, naphthalene dicarboxylic acid, diphenyl dicarboxylic acid, a derivative thereof, and a mixture thereof.

5. The polyester resin of claim 4, wherein the divalent acid component (a) comprises the terephthalic acid, the isophthalic acid, or a mixture thereof in an amount of 1 to 100 mol % based on a total number of moles of the divalent acid component (a).

6. The polyester resin of claim 1, wherein the polyester resin has a number average molecular weight of 2,000 to 20,000, a hydroxyl value of 2 to 60 mgKOH/g, and an acid value of 0.1 to 20 mgKOH/g.

7. The polyester resin of claim 1, wherein the polyester resin has a glass transition temperature of 80 to 150° C.

8. A coating composition, comprising:
a polyester resin; and
an organic solvent,
wherein the polyester resin comprises a repeating unit obtained by copolymerizing the following (a) and (b):
(a) a divalent acid component;
(b) a diol component comprising (b-1) an isosorbide, (b-2) a cycloaliphatic diol, and (b-3) neopentyl glycol,
wherein the cycloaliphatic diol (b-2) is one or more diol derivatives of a tricycle C7-14 alkane;
wherein a molar ratio of a sum of the isosorbide (b-1) and the cycloaliphatic diol (b-2) to the neopentyl glycol (b-3) is 0.5 to 2.5:1;
wherein the diol component (b) comprises 1 to 50 mol % of the isosorbide (b-1) and 1 to 80 mol % of the cycloaliphatic diol (b-2) based on a total number of moles of the diol component;
wherein an amount of the neopentyl glycol (b-3) employed for the copolymerization is 23 mol % to 52.3 mol % based on a total number of moles of the diol component (b) employed in the copolymerization; and
wherein the polyester resin has a glass transition temperature of 80° C. or higher.

9. The coating composition of claim 8, wherein the organic solvent is selected from the group consisting of an aromatic hydrocarbon solvent, a glycol ester solvent, a glycol ether solvent, a ketone solvent, an alcohol solvent, and a mixture thereof.

10. The coating composition of claim 8, wherein the coating composition comprises 10 to 40 wt % of the polyester resin and 60 to 90 wt % of the organic solvent.

11. The coating composition of claim 8, wherein the coating composition further comprises a component selected from the group consisting of a cross-linking agent, a curing catalyst, an additive for slip property, a smoothening agent, a defoaming agent, a pigment, a leveling agent, and a mixture thereof.

12. The coating composition of claim 8, wherein the cycloaliphatic diol (b-2) is a diol derivative of a compound selected from the group consisting of tricyclo[3.2.1.0$^{2,6}$] octane, tricyclo[4.2.1.0$^{2,6}$]nonane, tricyclo[5.2.1.0$^{2,6}$]decane, tricyclo[6.2.1.0$^{2,6}$]undecane, tricyclo[7.2.1.0$^{2,6}$]dodecane, tricyclo[4.2.1.1$^{2,5}$]decane, tricyclo[4.3.1.1$^{2,5}$]decane, tricyclo[4.4.1.1$^{2,5}$]decane, tricyclo[2.2.1.0$^{2,6}$]heptane, tricyclo[2.2.2.0$^{2,6}$]octane, tricyclo[3.2.2.0$^{2,6}$]nonane, tricyclo[3.3.1.1$^{3,6}$]decane, tricyclo[3.2.1.1$^{3,7}$]nonane, tricyclo[4.2.2.2$^{2,5}$]dodecane, tricyclo[4.3.2.2$^{2,5}$]tridecane, tricyclo[4.4.2.2$^{2,5}$]tetradecane, tricyclo[4.2.1.0$^{3,7}$]nonane, tricyclo[4.4.1.1$^{1,5}$]dodecane, tricyclo[6.2.1.0$^{2,7}$]undecane, tricyclo[5.2.2.0$^{2,6}$]undecane, tricyclo[6.2.2.0$^{2,7}$]dodecane, tricyclo[4.3.2.0$^{2,5}$]undecane, tricyclo[4.2.2.0$^{2,5}$]decane and tricyclo[5.5.1.0$^{3,11}$]tridecane, or a mixture thereof.

13. The coating composition of claim 8, wherein the divalent acid component (a) comprises one or more $C_8$-$C_{14}$ aromatic dicarboxylic acids.

14. The coating composition of claim 8, wherein the divalent acid component (a) comprises a compound selected from the group consisting of terephthalic acid, isophthalic acid, naphthalene dicarboxylic acid, diphenyl dicarboxylic acid, a derivative thereof, and a mixture thereof.

15. The coating composition of claim 8, wherein the divalent acid component (a) comprises the terephthalic acid, the isophthalic acid, or a mixture thereof in an amount of 1 to 100 mol % based on a total number of moles of the divalent acid component (a).

16. The coating composition of claim 8, wherein the polyester resin has a number average molecular weight of 2,000 to 20,000, a hydroxyl value of 2 to 60 mgKOH/g, and an acid value of 0.1 to 20 mgKOH/g.

* * * * *